June 11, 1963

Z. K. HASS 3,093,783

ELECTRONIC CIRCUITS FOR COMPOSING AN
A.C. VOLTAGE TO A D.C. VOLTAGE

Filed July 7, 1960

INVENTOR
ZYGMUNT K. HASS
BY- *Smart & Biggar*
ATTORNEYS

INVENTOR
ZYGMUNT K. HASS
BY— Smart & Biggar
ATTORNEYS

United States Patent Office 3,093,783
Patented June 11, 1963

3,093,783
ELECTRONIC CIRCUITS FOR COMPARING AN A.C. VOLTAGE TO A D.C. VOLTAGE
Zygmunt Konstanty Hass, Kitchener, Ontario, Canada, assignor to Marsland Engineering Limited, Kitchener, Ontario, Canada
Filed July 7, 1960, Ser. No. 41,313
28 Claims. (Cl. 318—327)

This invention relates to electric circuits for comparing an A.C. voltage to a D.C. voltage, and to the use of such circuits in control systems.

In the servomechanism art, it is frequently required that the speed of a two-phase A.C. motor be exactly proportional to the magnitude of an A.C. voltage which is applied to the servo-system, and that the sense of rotation of the motor should reverse if the phase of such variable phase voltage reverses relative to the other fixed phase voltage supplied to the motor. The variable phase voltage is ±90° out of phase with the fixed phase voltage. Feedback speed control of such a motor has heretofore been accomplished in one of two ways. In one known method, an A.C. input control voltage is compared with an A.C. voltage derived from a drag-cup tachometer generator driven by the motor. The two voltages are compared to produce an A.C. error voltage which, when applied to the motor, after suitable amplification as the variable phase voltage, tends to adjust the motor speed to the required value.

Unfortunately, the drag-cup tachometer generators known in the art are deficient in many respects. A perfect A.C. tachometer should yield an A.C. output strictly proportional to motor r.p.m., free from spurious voltages, and at a constant 180° phase relative to the input A.C. signal. A reasonably priced A.C. tachometer does not satisfactorily approach these requirements in many applications. Accordingly, a second method known in the art provides a D.C. tachometer generator instead of an A.C. tachometer to be driven by the A.C. motor. The D.C. tachometer is frequently more satisfactory than the A.C. tachometer for such a purpose. In this method, however, it has been necessary to provide a chopper to convert the D.C. output to A.C. Unfortunately, choppers known in the art are prone to failure in continuous service and generally are not very rugged. In this method the A.C. output from the chopper can then be compared with the input A.C. control signal to provide the required A.C. error signal.

The present invention overcomes the aforementioned disadvantages by providing a circuit adapted to compare an A.C. voltage with a D.C. voltage thereby to produce an A.C. error voltage. The circuit can thus be used to control an A.C. 2-phase motor with the aid of a D.C. tachometer generator driven by the motor, without the necessity of using a chopper. An additional method of controlling such a motor, using a comparison circuit according to the invention, is also provided using an A.C. tachometer generator and a frequency measuring circuit.

According to the present invention, an A.C.-D.C. voltage comparison circuit is provided which comprises an A.C. source in series with a D.C. source in series with a diode positioned so as to block flow of current from the D.C. source in the absence of any A.C. voltage. A passive circuit element, preferably an inductor, is connected in series with the aforementioned elements. The A.C. voltage across the passive circuit element will be zero unless the peak A.C. voltage amplitude exceeds the D.C. voltage amplitude, in which case the voltage across the passive element will take the form of pulses whose duration and amplitude depend upon the amount by which the peak A.C. voltage amplitude exceeds the D.C. voltage amplitude. A modified combination of two such circuits provides a new circuit which produces output pulses which have one phase if the peak A.C. voltage exceeds the D.C. voltage, and which undergo a 180° phase shift if the D.C. voltage exceeds the peak A.C. voltage. Temperature compensation and threshold voltage compensation are provided for the comparison circuit by a simple compensation circuit.

According to the present invention, a feedback control system is provided for an A.C. two phase motor, comprising a source of A.C. voltage, means adapted to be driven by the A.C. motor and to produce a D.C. feedback voltage which increases with the speed of the A.C. motor, a comparator adapted to compare the A.C. control voltage to the D.C. feedback voltage and adapted to produce an error A.C. voltage which is applied to the said A.C. motor thereby to control its speed. The comparator may be any of the embodiments of the A.C.–D.C. voltage comparison circuits according to the invention.

The present invention thus eliminates the need for an A.C. drag-cup tachometer generator in the feedback control of an A.C. two-phase motor. If a D.C. generator is used instead, no chopper is required to convert the D.C. into A.C.

The invention will now be described with reference to the accompanying drawings, in which.

Figure 1:
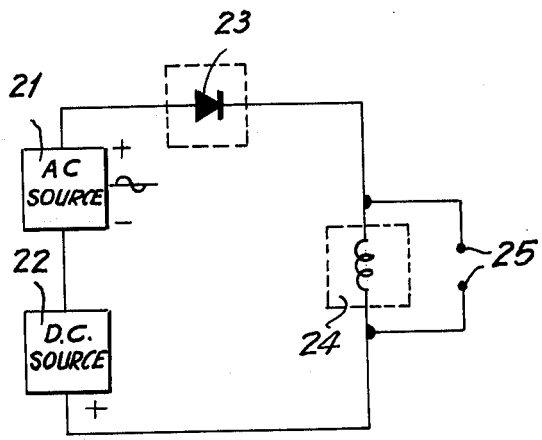
FIGURE 1 is a simplified comparison circuit for comparing an A.C. voltage to a D.C. voltage.

FIGURE 1 shows a simple comparison circuit according to the invention. The circuit comprises an A.C. voltage source 21, a D.C. voltage source 22, a comparison diode 23, and an inductor 24.

Figure 2:
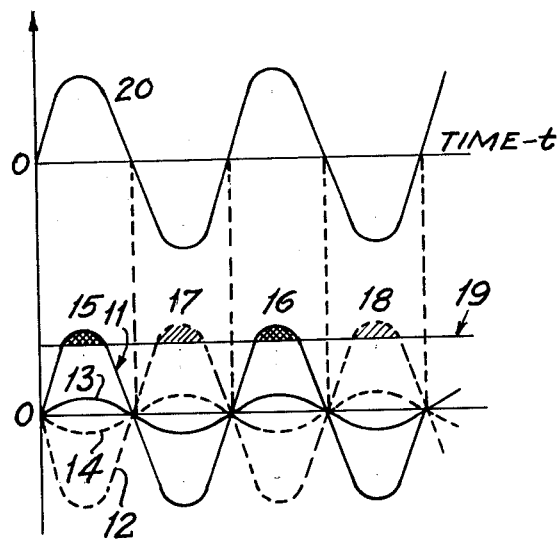
FIGURE 2 shows waveforms of the voltages in the circuit of FIGURE 1.

FIGURE 2 shows the waveforms of the voltages in the circuit of FIGURE 1. Curve 20 shows two complete cycles of the alternating sinusoidal voltage produced by A.C. voltage source 21. The curve is a plot of voltage amplitude against time.

With D.C. source 22 in the circuit, there can be no current flow, due to the blocking action of diode 23, unless the peak amplitude of the A.C. voltage is sufficient to overcome the D.C. bias. The lower portion of FIGURE 2 illustrates this fact. Curve 11 represents the voltage produced by A.C. source 21, whereas curve 19 which is a straight line represents the magnitude of the D.C. bias due to voltage source 22. It can readily be seen that with curve 11 rising above curve 19 only during voltage peaks, current will flow in the circuit only for a short portion of the entire A.C. cycle, i.e. that part of the cycle represented by pulses 15 or 16. If the D.C. bias is increased while A.C. voltage remains constant, the duration and amplitude of the pulses 15 and 16 will decrease to zero. An increase in the peak A.C. voltage amplitude relative to the D.C. voltage produces an increase in the duration and amplitude of the pulses. A phase shift of any amount in the input A.C. causes a corresponding phase shift in the output pulses. For example, if the phase of the A.C. voltage produced by source 21 is shifted by 180° (curve 12), then the output pulses will shift by 180° (pulses 17 and 18).

The inductor 24 will pass D.C. components of the output current pulses without offering much impedance, but the A.C. components of the pulses will develop an A.C. output voltage across the inductor which can be tapped at terminals 25. The A.C. output voltage will have a fundamental component whose frequency is equal to the frequency of the input A.C., whose phase is dependent upon that of the input A.C., and whose amplitude is dependent upon the amount by which the input A.C. voltage exceeds the D.C. bias. A phase shift of $n°$ in the input voltage will cause a phase shift of $n°$ in the fundamental component. Curve 13 shows the fundamental component of the output voltage appearing at terminals 25 corresponding to input A.C. voltage 11, whereas fundamental component curve 14 corresponds to input A.C. waveform 12.

There are some problems associated with the circuit of FIG. 1 if it is desired to use such a circuit as an A.C.–D.C. comparison circuit in a control system for a two-phase asynchronous A.C. motor. The diode 23 has a threshold bias, as a result of which comparison of small voltages is not very accurate, and diode 23 is temperature-sensitive especially if the diode is a semiconductor diode. Also, if the D.C. bias exceeds the peak A.C. amplitude, no pulse output is obtained. It is sometimes desirable to have a phase reversal (180° phase shift) of the pulse output when D.C. voltage exceeds A.C. voltage.

Figure 3:
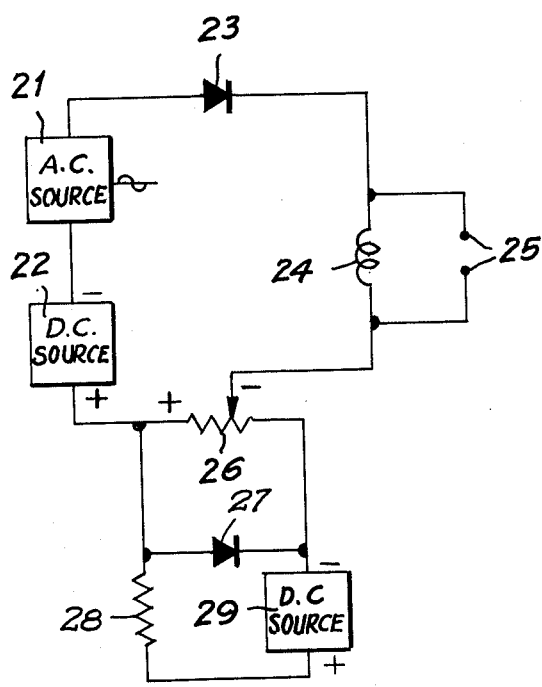
FIGURE 3 shows a comparison circuit of the type shown in FIGURE 1 and having additionally a temperature and threshold compensation circuit.

To overcome the difficulties caused by the threshold bias and temperature sensitivity of diode 23, a compensation circuit can be added to the simple circuit of FIG. 1. The resultant circuit is shown in FIG. 3. This circuit comprises in addition to the circuit elements of FIG. 1, a potentiometer 26, a compensating diode 27, biasing resistor 28 and D.C. voltage source 29. Since a silicon diode is preferably used as comparison diode 23, compensating diode 27 is preferably a germanium diode having a suitable temperature coefficient, and might be a so-called "stabistor." The compensating diode should have a temperature coefficient as close as possible to that of the comparison diode. The D.C. source 29 and resistor 28 form a constant current circuit; thus, the potential across diode 27 will have a negative temperature coefficient. The temperature coefficient of the compensation circuit is a function of its current; hence by adjusting the quiescent current, the temperature coefficient can be modified. The potentiometer 26 compensates for the threshold voltage of diode 23; the tap on the potentiometer can be selected so that the diode 23 is biased in the forward direction by a voltage equal to the threshold voltage.

Figure 4:
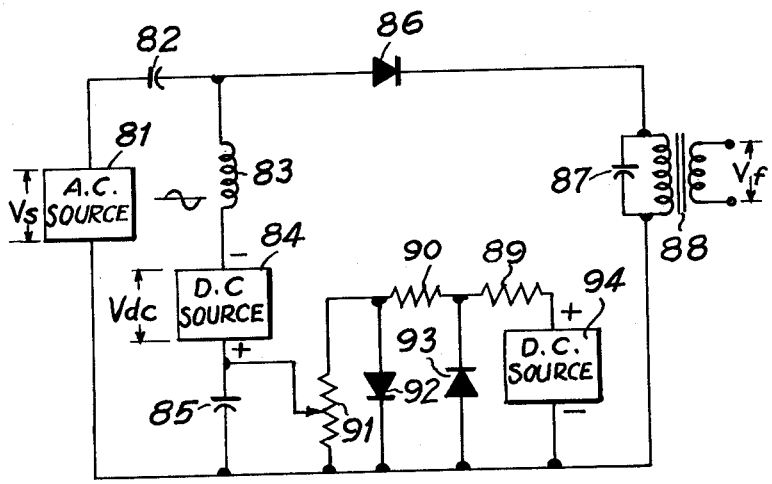
FIGURE 4 shows a second embodiment of a comparison circuit with a temperature and threshold compensation circuit.

A second temperature-compensated comparison circuit is shown in FIG. 4.

The comparison circuit according to FIG. 4 compares electrically the peak value of the A.C. voltage $Vs$ with the D.C. bias $Vdc$. The $Vdc$ bias may be derived from a battery, for example.

The $Vdc$ polarity is such that it biases the comparison diode 86 beyond cut-off. When A.C. voltage $Vs$ overcomes the D.C. bias $Vdc$ then a series of small positive current pulses is fed to the primary winding of the transformer 88. If $\overline{V}s$ is the peak value of the A.C. voltage $Vs$ (which may be any periodic voltage) then the height of the resulting pulses is $(\overline{V}s - Vdc)$.

The recurrent series of pulses has a Fourier fundamental frequency component $Vf$, plus all the harmonics. Only the fundamental frequency component is important, therefore all the harmonics may be filtered out. For this reason, the primary of the transformer 88 is tuned to resonance by the condenser 87. To sum up, the comparator produces an A.C. error voltage $Vf$ which is proportional to the difference of the peak value of the A.C. signal $Vs$ and the D.C. bias $Vdc$. And, the phase of the said error voltage $Vf$ is related to that of the A.C. signal voltage $Vs$. Condenser 87, as part of the resonant circuit 87–88, of course affects the relative phase of the output voltage $Vf$ with respect to the input voltage to transformer 88. For optimum performance of the system; the Fourier component should be exactly in phase with the signal voltage $Vs$.

The comparator diode 86 is not an ideal one, i.e. it has a threshold bias, below which no current will flow. This threshold bias makes the comparator inoperative at low levels of the A.C. voltage $Vs$. To make the diode 86 to resemble more closely an ideal diode, the threshold bias must be compensated for, i.e. the diode 86 must be given a forward bias by a D.C. positive bias equal to that of the threshold. This threshold compensating voltage is taken from the tap of the potentiometer 91.

The comparator diode 86, as all semiconductors, has a large temperature coefficient; therefore, the threshold compensating voltage must have the opposite temperature effects. This is achieved by deriving the threshold compensating voltage from a voltage regulator (diode 92) having an appropriate temperature coefficient. This voltage regulator should be stabilized against the mains variations, hence a Zener regulator 93 is connected additionally. The unregulated D.C. power supply 94 supplies voltage to the compensating circuit. Resistors 89 and 90 are the usual components associated with voltage regulators.

The operation of the temperature compensation circuit of FIG. 4 is as follows: when the temperature increases, diode 86 conducts more readily; the voltage across diode 92 drops, thus compensating the whole circuit.

To achieve proper temperature compensation of the circuit it is often necessary to connect several diodes (like 92) in series. The temperature coefficient of the diode 92 is adjusted by controlling the current flowing through the diode; this control is effected by modifying the resistor 90.

The Zener diode 93 should be of a very low voltage, so as to have a zero temperature coefficient.

Choke 83, having a large impedance for all useful frequencies, prevents the short circuit of the A.C. signal voltage by the D.C. bias.

Figure 5:
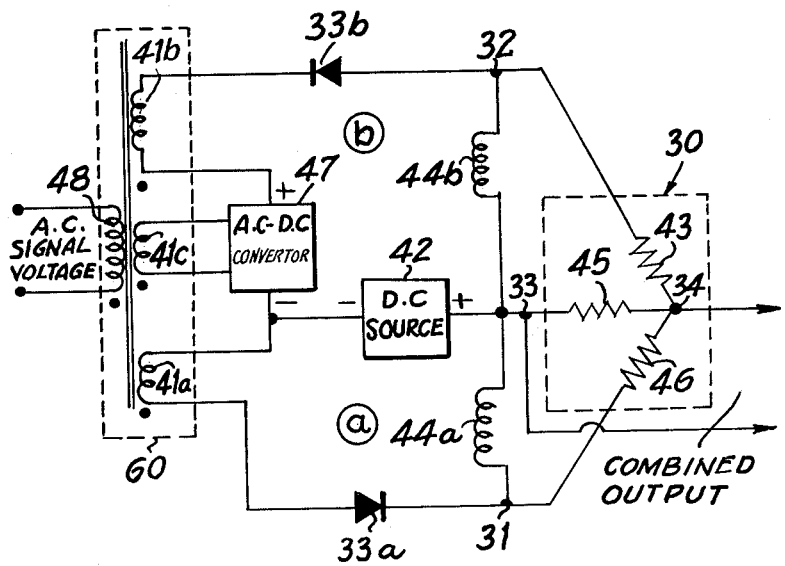
FIGURE 5 shows a preferred embodiment of a comparison circuit according to the invention.

To reverse the phase of the pulse output when the D.C. voltage exceeds the A.C. voltage, it is necessary to combine two circuits of the type shown in FIG. 1 or 3 or 4, with some modification. The resultant circuit is shown in FIG. 5. The circuit of FIG. 5 does not include the temperature and threshold bias compensation features shown in FIG. 3 or 4, but these features can be added to the circuit of FIG. 5 in a manner similar to the addition of the compensation circuit of FIG. 1. Simple circuitry will suffice, and the necessary circuit additions to FIG. 5 for compensation purposes will be obvious to anyone skilled in the art, once the circuits of FIGS. 3 or 4 are known.

FIG. 5 shows two circuits designated $a$ and $b$ each of which is similar to FIG. 1. The input A.C. voltage to be compared to a D.C. voltage produced by D.C. voltage source 42 is applied to primary winding 48 of transformer 60. The output of the two circuits $a$ and $b$ is summed in a summing network 30.

Network $a$ is substantially equivalent to the circuit of FIG. 1. It includes D.C. voltage source 42, comparison diode 33$a$, inductor 44$a$, and A.C. voltage source 41$a$. A.C. source 41$a$ is the secondary winding of transformer 60, and the number of turns on windings 48 and 41$a$ should be identical if it is desired to compare the input A.C. voltage directly with the D.C. voltage across D.C. source 42. It may be desirable to compare, in some circumstances, a multiple of the input voltage with the D.C. voltage, in which case the number of turns on windings 48 and 41$a$ should be designed accordingly.

Network *b* includes D.C. voltage source 42, inductor 44*b*, comparison diode 33*b*, and A.C. voltage source 41*b*. It differs from network *a* in that it includes additionally an A.C.-D.C. convertor 47 which delivers a D.C. voltage which is double the peak amplitude of the A.C. voltage received from secondary winding 41*c*. Secondary windings 41*a*, 41*b* and 41*c* all have the same number of turns. Alternatively, winding 41*c* could have double the number of turns of winding 41*a*, in which case the device 47 would not be a voltage doubler but would simply produce a D.C. voltage whose amplitude was equal to the peak amplitude of the A.C. voltage received from winding 41*c*. Diode 33*b* is therefore biased so that it will pass pulses only if the D.C. voltage across D.C. source 42 exceeds the peak amplitude of the A.C. voltage appearing at winding 41*b*.

The output of network *a* appears across the points 31 and 33, whereas the output of network *b* appears across the points 32 and 33. The combined output is obtained across terminals 33 and 34 by means of a conventional summing network 30. In this network, the resistors 43 and 46 are of equally large resistance value, whereas resistor 45 has a much lower resistance than resistor 43.

The operation of the circuit of FIGURE 5 is as follows: Circuits *a* and *b* receive equal A.C. voltages from transformer 60. Circuit *a* behaves exactly like the circuit of FIGURE 1; therefore it produces voltage pulses across inductor 44*a* whenever the A.C. voltage across winding 41*a* exceeds the D.C. bias across voltage source 42. These voltage pulses are in phase with the input A.C. voltage and their magnitude is dependent upon the difference in amplitude between the A.C. voltage across winding 41*a* and the D.C. voltage across D.C. source 42. Circuit *b* behaves exactly opposite to circuit *a*. It does not produce a pulsed output unless the D.C. voltage across source 42 is greater than the A.C. voltage received across winding 41*b*. (The windings 41*a* and 41*b* are for the present purposes assumed equal, in number of turns, to winding 48, and the phase of the voltage across the windings 41*a* and 41*b* relative to that across winding 48 is indicated by the dots shown on FIGURE 5.) Thus circuit *b* produces a pulsed output 180° out of phase with the input A.C. voltage, the magnitude of the pulsed output being dependent upon the amount by which the amplitude of the D.C. voltage across source 42 exceeds the peak amplitude of the input A.C. voltage. Thus the combined output obtained across the resistor 45 will include a fundamental A.C. component whose frequency is equal to that of the input A.C. voltage. The fundamental component will be in phase with the input voltage if the input voltage amplitude exceeds the D.C. bias across source 42; otherwise the fundamental component will be 180° out of phase with the input voltage. The amplitude of the fundamental component will increase with increasing difference between the amplitudes of the D.C. bias and the A.C. input.

Figure 6:
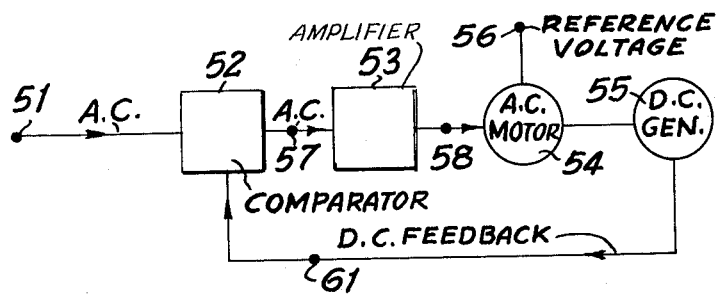
FIGURE 6 shows a block diagram of a control system for a two-phase A.C. motor.

The comparison circuit of FIGURE 1 or 5, preferably with the temperature and threshold bias compensation circuits added, can be used for the feedback speed control of an A.C. two-phase asynchronous motor. A block diagram of such a control system is shown in FIGURE 6. An A.C. 2-phase asynchronous motor 54 is driven by an A.C. fixed phase reference voltage 56 derived from the mains, which is applied to the motor via a 90° phase shift network, and by a control voltage 58 obtained from A.C. amplifier 53. If the reference voltage and the control voltage are in phase, the motor 54 will rotate in one direction (say clockwise) and if the reference voltage and the control voltage are 180° out of phase, the motor will rotate in the opposite direction (say counterclockwise). The amplifier 53 receives its A.C. input 57 from comparison circuit or comparator 52 which might be, for example, the circuit of FIGURES 1, 3, 4 or 5. Circuit 52 receives an A.C. input 51 which must be either in phase or 180° out of phase with reference voltage 56. The D.C. input 61 (corresponding to D.C. source 42 in FIGURE 4) is obtained from a D.C. generator 55 driven by motor 54.

The operation of the control system of FIGURE 6 is as follows: The desired speed of rotation of A.C. motor 54 is determined by the magnitude of input voltage 51, and the direction of rotation is determined by the phase of voltage 51 relative to reference voltage 56. Initially let us assume that the motor is at rest, the voltage 51 is zero, and it is desired to rotate the motor 54 at a certain constant speed. Voltage 51 is then accordingly set to the desired value and phase. Comparison circuit 52, when it is subjected to the input A.C. voltage change, compares the A.C. voltage to the D.C. voltage 61, the latter being zero since the motor 54 is not rotating. Thus a relatively large voltage output 57 is produced by comparison circuit 52, which is amplified by amplifier 53 to produce control voltage 58. The motor 54 quickly accelerates, driving D.C. generator 55. The D.C. generator produces a D.C. feedback voltage 61 which increases as the speed of rotation of motor 54 increases. The output 57 of the comparison circuit 52 drops as D.C. voltage 61 increases, and thus voltage 58 also decreases. The decrease in voltage 58 causes the motor 54 to accelerate less rapidly, until an equilibrium condition is reached where the motor 54 runs at a speed sufficient to produce a D.C. voltage 61 almost as large as A.C. voltage 51. The resultant error voltage 57 when amplified to produce control voltage 58, is just sufficient to overcome the load on the motor.

If the load should for any reason increase, the speed of the motor will decrease, causing a decrease in the feedback voltage 61. The voltage difference between input voltage 51 and feedback voltage 61 will, therefore, increase, thereby causing an increase in control voltage 58. The increased control voltage causes the motor to speed up so as to reassume its desired speed. Thus the motor speed remains substantially constant (subject to time lags in the control system) regardless of load variations. The speed and direction of rotation are determined by the magnitude and phase of the input voltage 51. If it is desired to change the value of voltage 51, it is preferable to make a gradual change rather than a sudden jump in order to avoid overloads and undesirable transients in the system.

Figure 7:
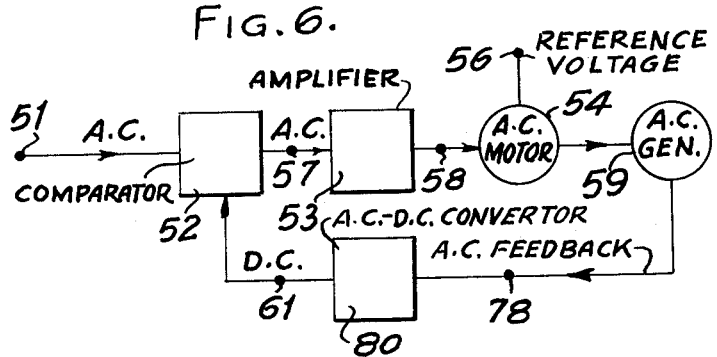
FIGURE 7 shows a block diagram of an alternative control system for a 2-phase A.C. motor.

FIGURE 7 shows a feedback control system identical to that of FIGURE 6 except that a permanent magnet A.C. generator 59 instead of a D.C. generator is driven by motor 54, and a frequency measuring circuit 80 produces a D.C. signal which is directly proportional to the frequency of the A.C. voltage output of generator 59 and thus is directly proportional to the speed of rotation of motor 54. A D.C. voltage 61 is thus produced which is compared with input A.C. voltage 51 in the same manner as previously described.

The frequency measuring circuit 80 can be a simple rectifier in some applications which are not too exacting. However, for more critical control systems, the circuit 80 should be a mean frequency integrator, i.e. a circuit giving a D.C. voltage proportional to the mean frequency of the output voltage from the A.C. generator 59.

The circuit shown in FIGURE 5 should be used as comparison circuit 52 (with temperature and threshold compensation preferably added) in FIGURES 6 and 7 if a braking effect is desired. Otherwise the circuits of FIGURE 1 or FIGURE 3 would probably suffice, assuming that only one of the two possible directions of motor rotation is desired. The braking effect is caused by the phase reversal of the error voltage when the D.C. voltage goes above the amplitude of the signal voltage. In normal operation, the A.C. voltage 51 will be slightly greater than the D.C. voltage 61, as explained previously. If the load increases, the motor speed and thus the D.C. voltage 61 drops, causing an increased error voltage which in turn causes the motor to accelerate to its normal speed. If, however, the load should decrease, the motor 54 will speed up, thereby causing an increased D.C. feedback voltage 61. In some cases the D.C. voltage 61 will exceed the A.C. voltage 51. If the circuit of FIGURE 1 or FIGURE 3 is used as circuit 52, then the error voltage 57 will be zero regardless of the amount by which voltage 61 exceeds voltage 51. If, however, the circuit of FIGURE 5 is used as comparison circuit 52, the error voltage 57 will undergo a phase reversal if the D.C. voltage 61 changes from a value less than A.C. voltage 51 to a value greater than A.C. voltage 51. But a phase reversal of voltage 57 (and therefore voltage 58 as well) tends to drive motor 54 in a direction opposite to its previous direction of rotation. Thus a braking effect is obtained which causes motor 54 to slow down until once again A.C. voltage 51 exceeds D.C. voltage 61.

The use of the comparison circuit 52 is not limited to the particular feedback control systems described above, but could be used in any application in which it is desired to compare an A.C. voltage to a D.C. voltage.

What I claim as my invention is:

1. An electric circuit for comparing an A.C. voltage to a D.C. voltage, comprising a first closed loop, having in series an A.C. voltage source, a first D.C. voltage source, a passive circuit element, a comparison semiconductor diode disposed in the loop so as to oppose flow of D.C. current from the first D.C. source in the absence of any A.C. voltage, and a first end terminal and the tap of a potentiometer; a second closed loop having in series a compensating diode having a negative temperature characteristic, a resistor, and a second D.C. voltage source; the end terminals of the compensating diode being connected to the end terminals of the potentiometer, the compensating diode and the second D.C. voltage source being disposed so that the compensating diode does not oppose D.C. current flow through the second closed loop, and the compensating diode being disposed so that it does not oppose D.C. current flow through itself due to the first D.C. voltage source.

2. An electric circuit as claimed in claim 1, wherein the said passive circuit element is an inductor.

3. An electric circuit for comparing an A.C. voltage to a D.C. voltage, comprising a first A.C. voltage source, a first loop having in series a first D.C. voltage source, a first passive circuit element, a second A.C. voltage source, and a first diode disposed so that it opposes flow of D.C. current in the first loop in the absence of any A.C. voltage; a second loop having in series the said first D.C. voltage source, a second passive circuit element, a third A.C. voltage source, a second D.C. voltage source adapted to produce a D.C. voltage of polarity opposite to that produced by the first D.C. source, and a second diode; the magnitude of the voltage produced by the second D.C. voltage source being double the peak amplitude of the third voltage, the second diode being disposed so that it opposes flow of D.C. current in the second loop whenever the peak amplitude of the A.C. voltage produced by the third A.C. voltage source exceeds the magnitude of the D.C. voltage produced by the first D.C. voltage source; and a summing network adapted to sum the output voltages appearing across the said passive circuit elements, the second and third A.C. voltage sources producing an A.C. voltage which is a constant multiple of the voltage produced by the first A.C. voltage source, and the polarity of the second A.C. voltage source being opposite to that of the third A.C. voltage source with respect to the first D.C. voltage source.

4. A circuit as claimed in claim 3, wherein the said passive circuit elements are inductors.

5. An electric circuit for comparing an A.C. voltage with a D.C. voltage comprising a first source of A.C. voltage, a transformer having a primary winding, a first secondary winding, a second secondary winding, and a third secondary winding, the primary winding being fed by the first source of A.C. voltage; a first loop having in series a D.C. voltage source, a first inductor whose first terminal is connected to the D.C. source, the said first secondary winding, and a first diode which opposes flow of D.C. current through the first loop in the absence of any A.C. voltage across the first secondary winding; a second loop having in series the said D.C. voltage source, a second inductor whose first terminal is connected to the D.C. source and to the first terminal of the first inductor, a convertor, and a second diode, the said second secondary winding; the said second secondary winding, when energized by the flow of current through the said primary winding, developing an A.C. voltage whose magnitude is substantially identical to that developed across the first secondary winding and whose polarity is opposite to that developed across the first secondary winding with respect to the said D.C. voltage source, the convertor receiving A.C. voltage from the said third secondary winding and developing a D.C. voltage whose magnitude is double the peak amplitude of the A.C. voltage developed across the second secondary winding and whose polarity is opposite to the polarity of the D.C. voltage source, the second diode disposed so as to oppose flow of D.C. current in the second loop whenever the peak amplitude of the A.C. voltage across the said second secondary winding exceeds the magnitude of the D.C. voltage across the D.C. voltage source; a first resistor whose first terminal is connected to the first terminal of the first inductor, a second resistor whose first terminal is connected to the second terminal of the first inductor and whose second terminal is connected to the second terminal of the first resistor, and a third resistor whose first terminal is connected to the second terminal of the second inductor and whose second terminal is connected to the second terminal of the first resistor, the first resistor having a substantially smaller resistance than the second resistor, and the second resistor having a resistance substantially equal to that of the third resistor.

6. A circuit as claimed in claim 5 wherein the turns ratio of the primary winding to the first secondary winding is unity.

7. A circuit as claimed in claim 5 wherein the third secondary winding has substantially twice the number of turns of the second secondary winding, and the voltage developed across the third secondary winding is rectified and filtered to produce a D.C. voltage whose magnitude is substantially twice the peak amplitude of the A.C. voltage developed across the second secondary winding.

8. A circuit as claimed in claim 5 wherein the third secondary winding has substantially the same number of turns as the second secondary winding, and the voltage developed across the third secondary winding is fed to a voltage doubler which develops a D.C. voltage whose magnitude is substantially twice the peak amplitude of the A.C. voltage developed across the second secondary winding.

9. A feedback control system for an A.C. two phase motor, comprising a source of A.C. control voltage, means adapted to be driven by said A.C. motor to produce a D.C. feedback voltage which increases with the speed of the A.C. motor, a diode, a passive circuit element, and means to apply the error voltage developed across the passive circuit element to the A.C. motor thereby to control the speed of the A.C. motor; the source of A.C. control voltage, the D.C. feedback voltage, the diode, and the passive circuit element being in series in a closed loop; the diode being disposed so as to block flow of current due to the D.C. feedback voltage.

10. A control system as claimed in claim 9, wherein the means adapted to be driven by the A.C. motor is a D.C. generator.

11. A control system as claimed in claim 10 wherein the said passive circuit element is an inductor.

12. A control system as claimed in claim 11, wherein the means to apply the voltage developed across the passive circuit element to the A.C. motor is an amplifier.

13. A control system as claimed in claim 9, wherein the means adapted to be driven by the A.C. motor is an A.C. generator which produces an output signal whose frequency is proportional to the speed of the A.C. motor, in combination with a frequency measuring circuit responsive to the frequency of the A.C. generator output signal and adapted to produce a D.C. output voltage which increases with increasing frequency of the A.C. generator output signal.

14. A control system as claimed in claim 13, wherein the said passive circuit element is an inductor.

15. A control system as claimed in claim 14, wherein the means to apply the voltage developed across the passive circuit element to the A.C. motor is an amplifier.

16. A feedback control system as claimed in claim 15, wherein the said amplifier applies the amplified error voltage to the A.C. motor at a phase of ±90° with respect to the fixed phase voltage applied to the A.C. motor.

17. A feedback control system as claimed in claim 12, wherein the said amplifier applies the amplified error voltage to the A.C. motor at a phase of ±90° with respect to the fixed phase voltage applied to the A.C. motor.

18. A circuit as claimed in claim 3 having additionally an A.C. two-phase motor; wherein the first D.C. voltage source is a source of D.C. feedback voltage responsive to the speed by the said motor, the D.C. feedback voltage increasing with increasing speed of the said motor, and the output of the said summing network is applied to the said A.C. motor as a variable phase input thereby to control the speed of the motor.

19. A circuit as claimed in claim 5 having additionally an A.C. two-phase motor driven by a fixed phase input voltage and a variable phase input voltage, wherein the D.C. voltage source is a source of D.C. feedback voltage responsive to the speed of the motor, the said D.C. feedback voltage increasing with increasing motor speed, and the voltage across the said first resistor is applied to the said A.C. motor as the variable phase input voltage thereby to control its speed.

20. A circuit as claimed in claim 19, wherein the D.C. voltage source is a D.C. generator driven by the A.C. motor.

21. A circuit as claimed in claim 19, wherein the voltage across the said first resistor is applied to the said A.C. motor through an amplifier.

22. A circuit as claimed in claim 19, wherein the D.C. voltage source is an A.C. generator in combination with a frequency measuring circuit the A.C. generator being driven by the motor, the generator producing an output signal whose frequency is proportional to the speed of the A.C. motor, and the frequency measuring circuit producing a D.C. output which increases with increasing frequency of the generator output signal.

23. A circuit as claimed in claim 4, wherein the first A.C. voltage source supplies the primary winding of a transformer, and the second and third voltage sources are secondary windings of the said transformer.

24. A circuit as claimed in claim 4, having additionally circuits adapted to compensate for the threshold voltage and temperature sensitivity of the said diodes.

25. A circuit as claimed in claim 5, having additionally circuits adapted to compensate for the threshold voltage and temperature sensitivity of the said diodes.

26. A feedback control system for an A.C. two phase motor, comprising a source of A.C. control voltage, means adapted to be driven by said A.C. motor and to produce a D.C. feedback voltage which increases with the speed of the A.C. motor, and a comparator adapted to compare the A.C. control voltage to the D.C. feedback voltage and adapted to produce an error A.C. voltage which is applied to the said A.C. motor thereby to control its speed, the comparator including a unidirectional circuit element and a passive circuit element in series with the said source of A.C. control voltage and with the source of D.C. feedback voltage, the unidirectional circuit element being disposed so as to block flow of current caused by the D.C. feedback voltage, and the said error voltage being the voltage developed across the passive circuit element.

27. A control system is defined in claim 26 wherein the comparator includes a first closed loop having in series the said source of A.C. control voltage, a first D.C. voltage source, said passive circuit element, a comparison semiconductor diode disposed in the loop so as to oppose flow of D.C. current from the first D.C. source in the absence of any A.C. voltage, and a first end terminal and the tap of a potentiometer; a second closed loop having in series a compensating diode having a negative temperature characteristic, a resistor, and a second D.C. voltage source; the end terminals of the compensating diode being connected to the end terminals of the potentiometer, the compensating diode and the second D.C. voltage source being disposed so that the compensating diode does not oppose D.C. current flow through the second closed loop, the compensating diode being disposed so that it does not oppose D.C. current flow through itself caused by the first D.C. voltage source, said first D.C. voltage source being the source of D.C. feedback voltage, and said comparison diode being the said unidirectional element.

28. A control system as defined in claim 26, wherein the comparator includes a first A.C. voltage source, a first loop having in series a first D.C. voltage source, said passive circuit element, a second A.C. voltage source, and a first diode disposed so that it opposes flow of D.C. current in the first loop in the absence of any A.C. voltage; a second loop having in series the said first D.C. voltage source, a second passive circuit element, a third A.C. voltage source, a second D.C. voltage source adapted to produce a D.C. voltage of polarity opposite to that produced by the first D.C. source, and a second diode; the magnitude of the voltage produced by the second D.C. voltage source being double the peak amplitude of the third voltage, the second diode being disposed so that it opposes flow of D.C. current in the second loop whenever the peak amplitude of the A.C. voltage produced by the third A.C. voltage source exceeds the magnitude of the D.C. voltage produced by the first D.C. voltage source; and a summing network adapted to sum the output voltages appearing across the said passive circuit elements, the second and third A.C. voltage sources producing an A.C. voltage which is a constant multiple of the voltage produced by the first A.C. voltage source, the polarity of the second A.C. voltage source being opposite that of the third A.C. voltage source with respect to the first D.C. voltage source, the first A.C. voltage source being the source of A.C. control voltage, and the first D.C. voltage source being the source of D.C. feedback voltage.

References Cited in the file of this patent

UNITED STATES PATENTS

| | | |
|---|---|---|
| 2,653,285 | Gray | Sept. 22, 1953 |
| 2,714,702 | Schockley | Aug. 2, 1955 |
| 2,810,874 | Faymoreau | Oct. 22, 1957 |
| 2,832,019 | Cohen | Apr. 22, 1958 |
| 2,979,717 | Shaw | Apr. 11, 1961 |